(12) United States Patent
Takahashi et al.

(10) Patent No.: US 10,615,385 B2
(45) Date of Patent: Apr. 7, 2020

(54) BATTERY PACK (71) Applicant: HONDA MOTOR CO., LTD., Tokyo (JP)

(72) Inventors: Koichi Takahashi, Wako (JP); Shutaro Sao, Wako (JP); Ken Yasui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 82 days.

(21) Appl. No.: 15/883,097

(22) Filed: Jan. 30, 2018

(65) Prior Publication Data
US 2018/0269443 A1 Sep. 20, 2018

(30) Foreign Application Priority Data

Mar. 17, 2017 (JP) ................................ 2017-052463

(51) Int. Cl.
*H01M 4/02* (2006.01)
*H01M 2/10* (2006.01)
(52) U.S. Cl.
CPC ...... *H01M 2/1077* (2013.01); *H01M 2220/20* (2013.01); *Y02T 10/7005* (2013.01)
(58) Field of Classification Search
CPC .................................................... H01M 4/02
See application file for complete search history.

(56) References Cited

U.S. PATENT DOCUMENTS

2015/0030897 A1* 1/2015 Paramasivam ..... H01M 10/625
429/83

FOREIGN PATENT DOCUMENTS

| JP | 5271334 B2 | 5/2011 |
|---|---|---|
| JP | 2013-055056 | 3/2013 |
| JP | 2015-05356 | 1/2015 |
| JP | 2015-153470 | 8/2015 |
| JP | 2016-072107 | 5/2016 |
| JP | 2016-162530 | 9/2016 |
| JP | 2017-04606 | 1/2017 |

OTHER PUBLICATIONS

Japanese Office Action for corresponding JP Application No. 2017-052463, dated Nov. 20, 2018 (w/ machine translation).

* cited by examiner

*Primary Examiner* — Jacob B Marks
(74) *Attorney, Agent, or Firm* — Mori & Ward, LLP (57) ABSTRACT

A battery pack includes a first battery module, a second battery module, and a connector. The first battery module includes laminated cells and has a first outer surface. The second battery module includes laminated cells and has a second outer surface. The second battery module is provided adjacent to the first battery module. The connector has a plane surface and is provided on the first battery module and the second battery module such that the plane surface of the connector opposes the first outer surface and the second outer surface to connect the first battery module and the second battery module.

20 Claims, 7 Drawing Sheets

BATTERY PACK

CROSS-REFERENCE TO RELATED APPLICATIONS

The present application claims priority under 35 U. S. C. § 119 to Japanese Patent Application No. 2017-052463, filed Mar. 17, 2017. The contents of this application are incorporated herein by reference in their entirety.

BACKGROUND

1. Field

The present invention relates to a battery pack.

2. Description of the Related Art

Heretofore, as this type of battery pack, a battery pack having multiple battery modules arranged next to one another in the horizontal direction (lengthwise and breadthwise) and stored in a battery case is becoming widely available (see Japanese Patent No. 5271334, and Japanese Patent Application Publication No. 2013-55056, for example).

SUMMARY

According to one aspect of the present invention, a battery pack is a battery pack in which multiple battery modules each having multiple cells laminated therein are arranged along a module arrangement direction perpendicular to a laminate direction of the multiple cells, battery modules adjacent in the module arrangement direction, among the multiple battery modules, being connected through a plate-like connection member, in which: the connection member has a plane part parallel to the module arrangement direction; and the plane part engages with each of the battery modules adjacent in the module arrangement direction, among the multiple battery modules, to connect the battery modules together.

According to another aspect of the present invention, a battery pack includes a first battery module, a second battery module, and a connector. The first battery module includes laminated cells and has a first outer surface. The second battery module includes laminated cells and has a second outer surface. The second battery module is provided adjacent to the first battery module. The connector has a plane surface and is provided on the first battery module and the second battery module such that the plane surface of the connector opposes the first outer surface and the second outer surface to connect the first battery module and the second battery module.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment will now be described with reference to the accompanying drawings, wherein like reference numerals designate corresponding or identical elements throughout the various drawings.

Hereinafter, a first embodiment of the present invention will be described with reference to the drawings.

First Embodiment

Figure 1:
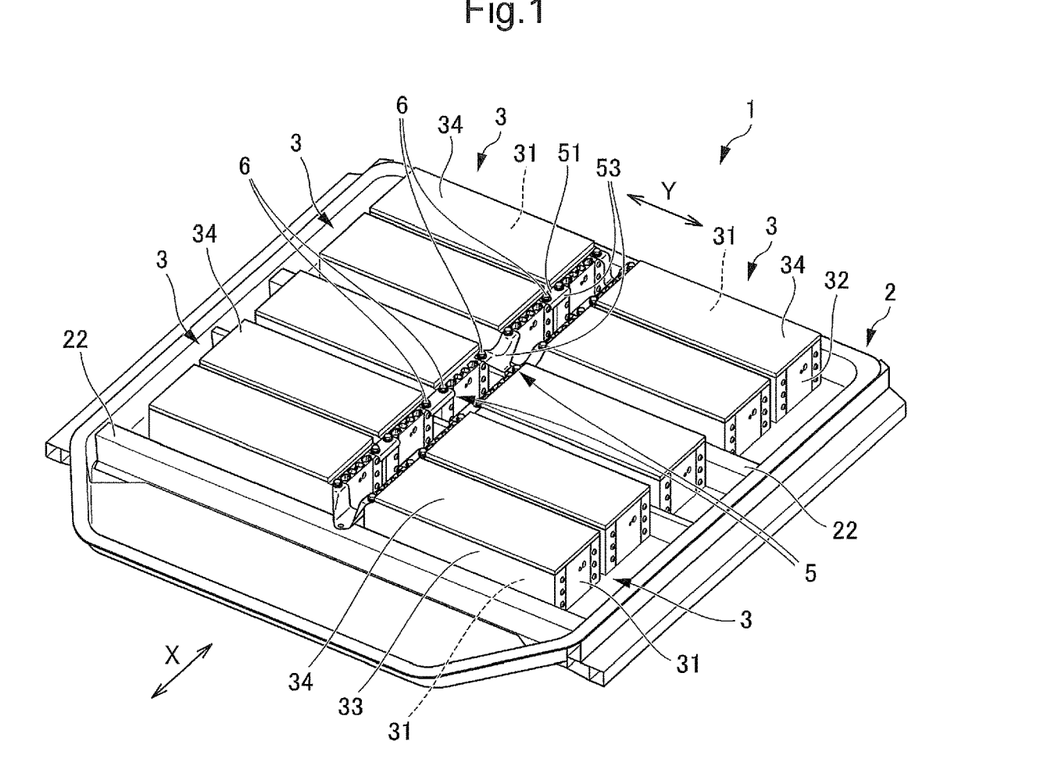
FIG. 1 is a perspective view of a battery pack of a first embodiment of the present invention.
Figure 2:
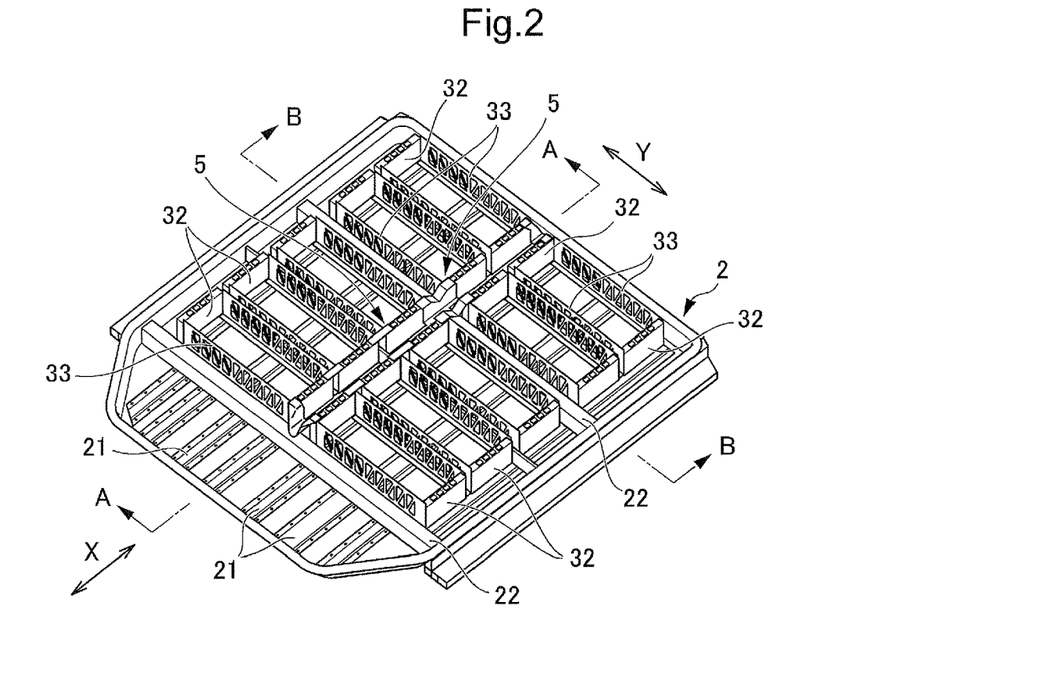
FIG. 2 is a perspective view of the battery pack of FIG. 1, from which module main bodies of battery modules are removed.
Figure 3:
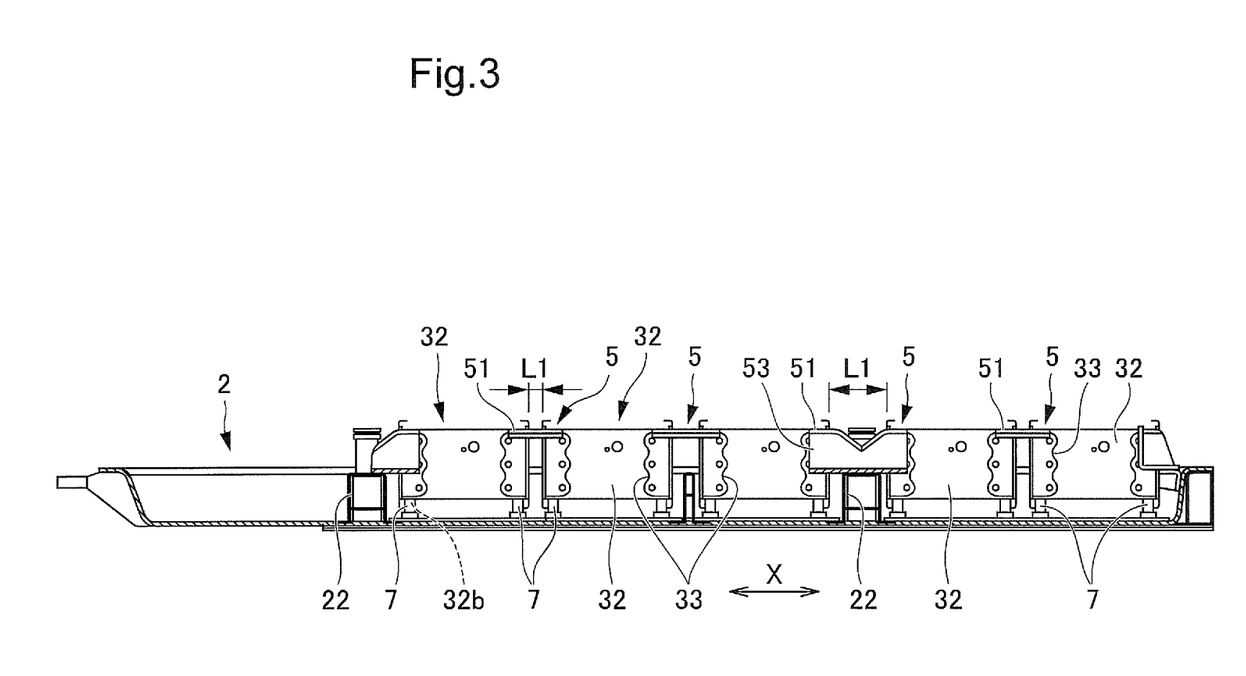
FIG. 3 is a cross-sectional view of the battery pack of FIG. 2, taken along line A-A.
Figure 4:
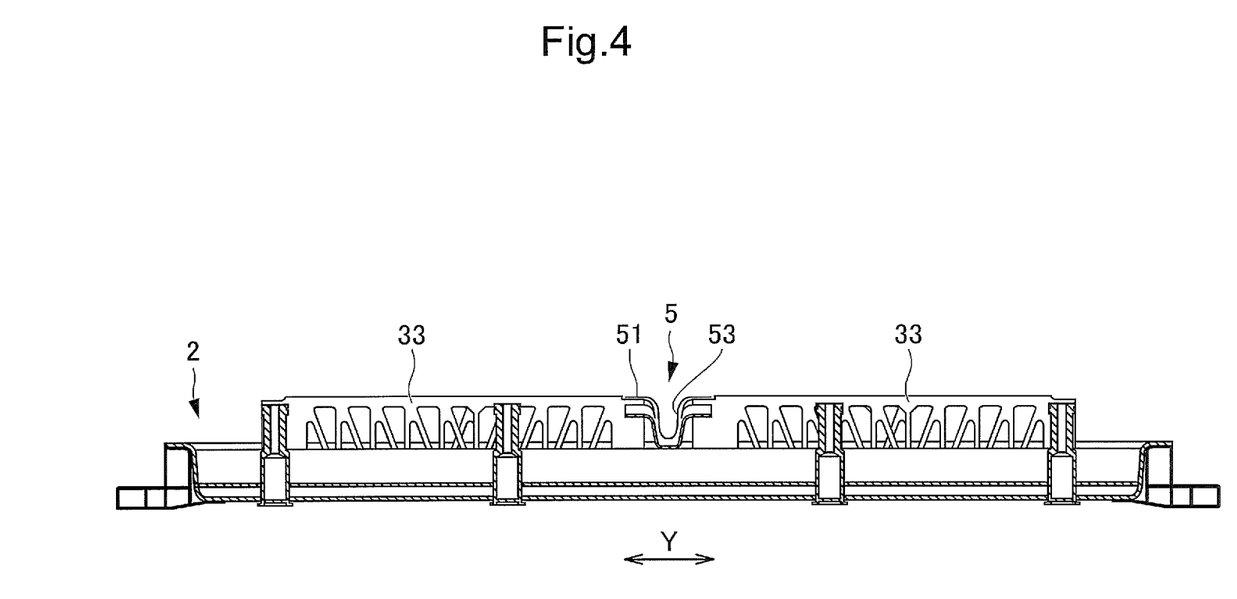
FIG. 4 is a cross-sectional view of the battery pack of FIG. 2, taken along line B-B.
Figure 5:
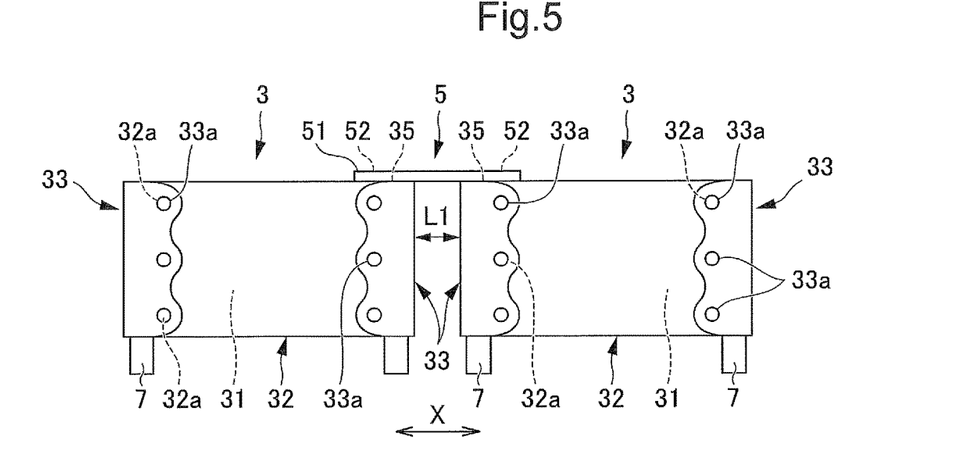
FIG. 5 is a front view schematically showing a connected state of the battery modules in the battery pack of FIG. 1.

FIG. 1 is a perspective view of a battery pack of a first embodiment of the present invention. FIG. 2 is a perspective view of the battery pack of FIG. 1, from which module main bodies of battery modules are removed. FIG. 3 is a cross-sectional view of the battery pack of FIG. 2, taken along line A-A. FIG. 4 is a cross-sectional view of the battery pack of FIG. 2, taken along line B-B. FIG. 5 is a front view schematically showing a connected state of the battery modules in the battery pack of FIG. 1.

A battery pack 1 of the first embodiment is arranged on the lower side of a floor panel of an electric vehicle. As illustrated in FIGS. 1 and 2, the battery pack 1 has a substantially flat plate-shaped battery case 2. The battery case 2 has cross members 21 as multiple reinforcement members arranged in the vehicle traveling direction (arrow X direction in FIG. 2), and cross members 22 as multiple reinforcement members arranged in the vehicle width direction (arrow Y direction in FIG. 2).

As illustrated in FIG. 1, in the battery case 2, ten battery modules 3 are stored and fixed in a matrix, such that five units are arranged in the vehicle traveling direction (arrow X direction in FIG. 1), and two units are arranged in the vehicle width direction (arrow Y direction in FIG. 1). As illustrated in FIGS. 1 and 2, each battery module 3 is configured of: a module main body 31 in which multiple plate-shaped cells are laminated in the vehicle width direction; a pair of end plates 32 attached to both end faces of the module main body 31; a pair of side plates 33 fixed while sandwiching the module main body 31 from both side faces thereof and extending to surround the end plates 32; and a battery cover 34 covering the module main body 31 from the upper side thereof.

As illustrated in FIGS. 3 and 5, the end plate 32 has multiple holes 32a on both end parts thereof, and the side plate 33 has multiple holes 33a on both end parts thereof bent at a right angle. Then, bolts (not shown) are inserted into the holes 32a of the end plates 32 and the holes 33a of the side plates 33 and fastened, to thereby fix the pair of side plates 33 to the pair of end plates 32, and a rectangular frame is assembled as a whole. Additionally, the module main body 31 is placed inside the frame.

As illustrated in FIG. 3, the end plate 32 has multiple holes 32b formed in a lower face thereof. Anchor bolts 7 provided in a standing manner on the bottom face of the battery case 2 are inserted into the holes 32b and fastened, to thereby fix the end plate 32 to the battery case 2.

Of the multiple battery modules 3, the battery modules 3 adjacent in the module arrangement direction (arrow X direction in FIG. 1) perpendicular to the cell laminate direction (arrow Y direction in FIG. 1) are connected through a plate-like connection member (stay) 5, which is placed on top faces of the end plates 32. In other words, as illustrated in FIGS. 1 and 5, the connection member 5 has a plane portion 51 parallel to the module arrangement direction (arrow X direction in FIG. 5). Two first insertion holes 52 are formed in the plane portion 51. Meanwhile, second insertion holes 35 are formed in both end parts of the end plate 32 of the battery module 3. Bolts 6 as bar-like fastening members are inserted into the first insertion holes 52 and the second insertion holes 35 to fix the plane portion 51 of the connection member 5 to the battery modules 3, and thereby connect the battery modules 3 together.

As illustrated in FIGS. 1, 3, and 4, the connection member 5 has a flange portion 53 perpendicular to the plane portion 51. The flange portion 53 is formed in such a manner as to extend along the outer shape of the battery module 3. Moreover, as illustrated in FIG. 3, the connection member 5 is fixed to the cross member 22 of the battery case 2.

As has been described, in the battery pack 1, multiple battery modules 3 each having multiple cells laminated therein are arranged along the module arrangement direction (arrow X direction in FIG. 1) perpendicular to the laminate direction of the multiple cells. Of the multiple battery modules 3, battery modules 3 adjacent in the module arrangement direction are connected through the plate-like connection member 5. The connection member 5 has the plane portion 52 parallel to the module arrangement direction, and the plane portion 51 engages with each of the battery modules 3 adjacent in the module arrangement direction, to connect the battery modules 3 together.

Accordingly, even if the weight of the battery module 3 acts on the battery case 2, only a shearing force acts on the connection member 5 connecting the battery modules 3, and a distance L1 between the battery modules 3 hardly changes. Accordingly, the group of modules including multiple battery modules 3 connected by the connection members 5 has high rigidity and durability as a whole.

As a result, even if the weight of the battery module 3 increases along with increase in its power and capacity in the battery pack 1, warpage of the battery case 2 caused by the weight of the battery module 3 can be suppressed. Also, deterioration in comfort of riding due to vibration of the electric vehicle can be suppressed. It is also possible to prevent separate battery modules 3 from falling off when the battery case 2 burns.

Additionally, when assembling the battery pack 1, the connection member 5 can be attached from the upper side of the battery case 2 when attaching the connection member 5 between the battery modules 3. Hence, attachment of the connection member 5 can be made easier than when it is attached from the side or lower side of the battery case 2.

Also, since the connection member 5 has the flange portion 53 perpendicular to the plane portion 51, rigidity of the connection member 5 can be improved, and therefore rigidity of the entire battery pack 1 can be improved. In addition to this, since the flange portion 53 extends along the outer shape of the battery module 3, the connection member 5 fits into a part of the battery module 3 when assembling the battery pack 1. Hence, the connection member 5 can be located easily.

Moreover, as illustrated in FIG. 3, in the battery pack 1, the connection member 5 is fixed to the cross member 22 of the battery case 2. Hence, the connection member 5 does not move relative to the battery case 2, and rigidity of the battery pack 1 can be improved even more.

Modification 1 of First Embodiment

Figure 6:
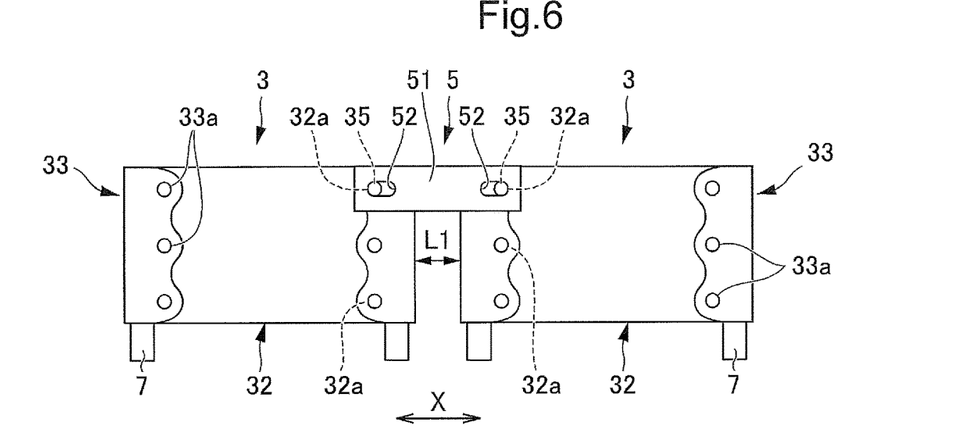
FIG. 6 is a front view schematically showing a connected state of battery modules of a battery pack of Modification 1 of the first embodiment of the present invention.

FIG. 6 is a front view schematically showing a connected state of battery modules of a battery pack of Modification 1 of the first embodiment of the present invention.

While the connection member 5 is placed on top faces of the end plates 32 in the aforementioned first embodiment as illustrated in FIG. 5, in a battery pack 1 of Modification 1, a connection member 5 is attached to upper parts of side faces of end plates 32 as illustrated in FIG. 6. Accordingly, some of multiple holes 32a for fixing side plates 33 to the end plates 32 also serve as second insertion holes 35 for fixing the connection member 5 to the end plates 32. In addition, both of two first insertion holes 52 of the connection member 5 are long holes extending in a module arrangement direction (direction X in FIG. 6). Other configurations are basically the same as the aforementioned first embodiment.

Hence, Modification 1 has the same effects as the aforementioned first embodiment. In addition, since the hole 32a of the end plate 32 also serves as the second insertion hole 35, the structure of the battery pack 1 can be simplified. Also, since the first insertion holes 52 of the connection member 5 are long holes extending in the module arrangement direction, even if there is dimensional error in a distance L1 in the module arrangement direction between the battery modules 3 when assembling the battery pack 1, the connection member 5 can be attached between the battery modules 3 while absorbing the tolerance of the battery module 3. Thus, productivity of the battery pack 1 can be improved.

Modification 2 of First Embodiment

Figure 7:
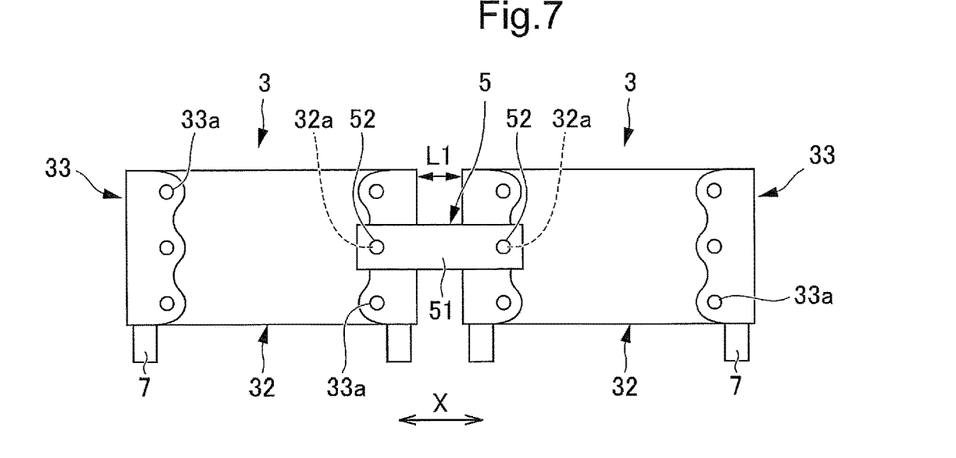
FIG. 7 is a front view schematically showing a connected state of battery modules of a battery pack of Modification 2 of the first embodiment of the present invention.

FIG. 7 is a front view schematically showing a connected state of battery modules of a battery pack of Modification 2 of the first embodiment of the present invention.

While the connection member 5 is attached to upper parts of side faces of the end plates 32 in the aforementioned Modification 1 of the first embodiment as illustrated in FIG. 6, in a battery pack 1 of Modification 2, a connection member 5 is attached to center parts of side faces of end plates 32 as illustrated in FIG. 7. Note that both of two first insertion holes 52 of the connection member 5 are circular holes. Other configurations are basically the same as the aforementioned Modification 1 of the first embodiment.

Hence, Modification 2 has the same effects as the aforementioned Modification 1 of the first embodiment, except for the effects of forming the first insertion holes 52 into long holes.

Modification 3 of First Embodiment

Figure 8:
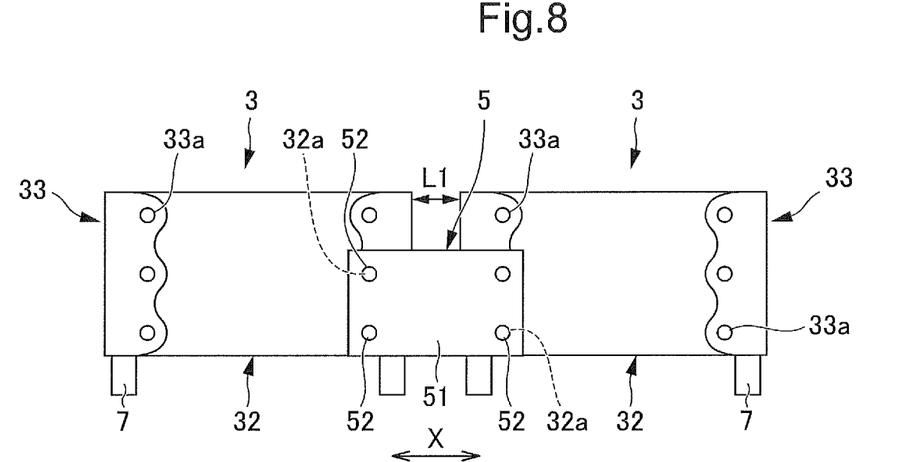
FIG. 8 is a front view schematically showing a connected state of battery modules of a battery pack of Modification 3 of the first embodiment of the present invention.

FIG. 8 is a front view schematically showing a connected state of battery modules of a battery pack of Modification 3 of the first embodiment of the present invention.

While the connection member 5 is attached to center parts of side faces of the endplates 32 in the aforementioned Modification 2 of the first embodiment as illustrated in FIG. 7, in a battery pack 1 of Modification 3, a connection member 5 is attached to center to lower parts of side faces of end plates 32 as illustrated in FIG. 8. Other configurations are basically the same as the aforementioned Modification 2 of the first embodiment.

Hence, Modification 3 has the same effects as the aforementioned Modification 2 of the first embodiment.

Modification 4 of First Embodiment

Figure 9:
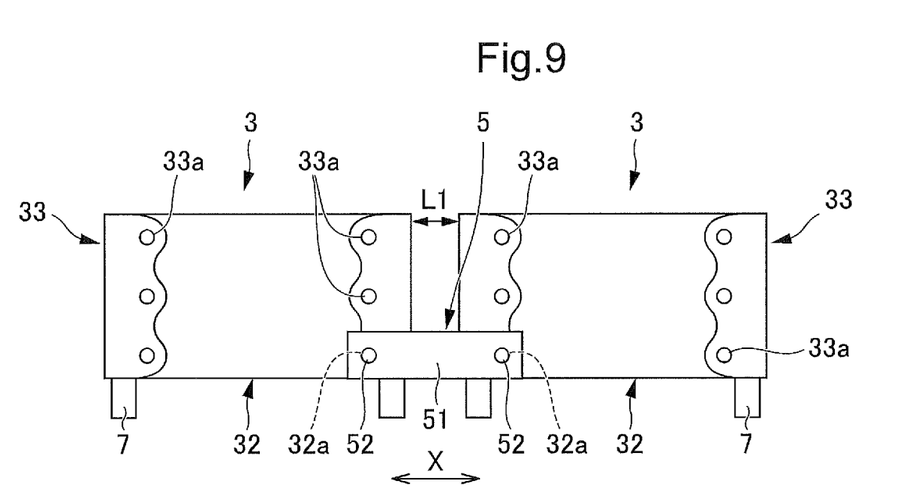
FIG. 9 is a front view schematically showing a connected state of battery modules of a battery pack of Modification 4 of the first embodiment of the present invention.

FIG. 9 is a front view schematically showing a connected state of battery modules of a battery pack of Modification 4 of the first embodiment of the present invention.

While the connection member 5 is attached to center parts of side faces of the endplates 32 in the aforementioned Modification 2 of the first embodiment as illustrated in FIG. 7, in a battery pack 1 of Modification 4, a connection member 5 is attached to lower parts of side faces of end plates 32 as illustrated in FIG. 9. Other configurations are basically the same as the aforementioned Modification 2 of the first embodiment.

Hence, Modification 4 has the same effects as the aforementioned Modification 2 of the first embodiment.

Other Embodiments

Although embodiments of the present invention have been described, the invention is not limited to the aforementioned embodiments. The effects described in the embodiments are merely a list of the most preferable effects achievable by the invention, and the effects of the invention are not limited to those described in the embodiments.

For example, the aforementioned Modification 1 of the first embodiment describes a case where some of the multiple holes 32a for fixing the side plates 33 to the end plates 32 also serve as the second insertion holes 35 for fixing the connection member 5 to the end plates 32. However, all or some of the holes 32b for fixing the end plates 32 to the cross member 21 of the battery case 2 may also serve as the second insertion holes 35. In this case, since the holes 32a of the end plates 32 also serve as the second insertion holes 35, the structure of the battery pack 1 can be simplified.

Figure 10:
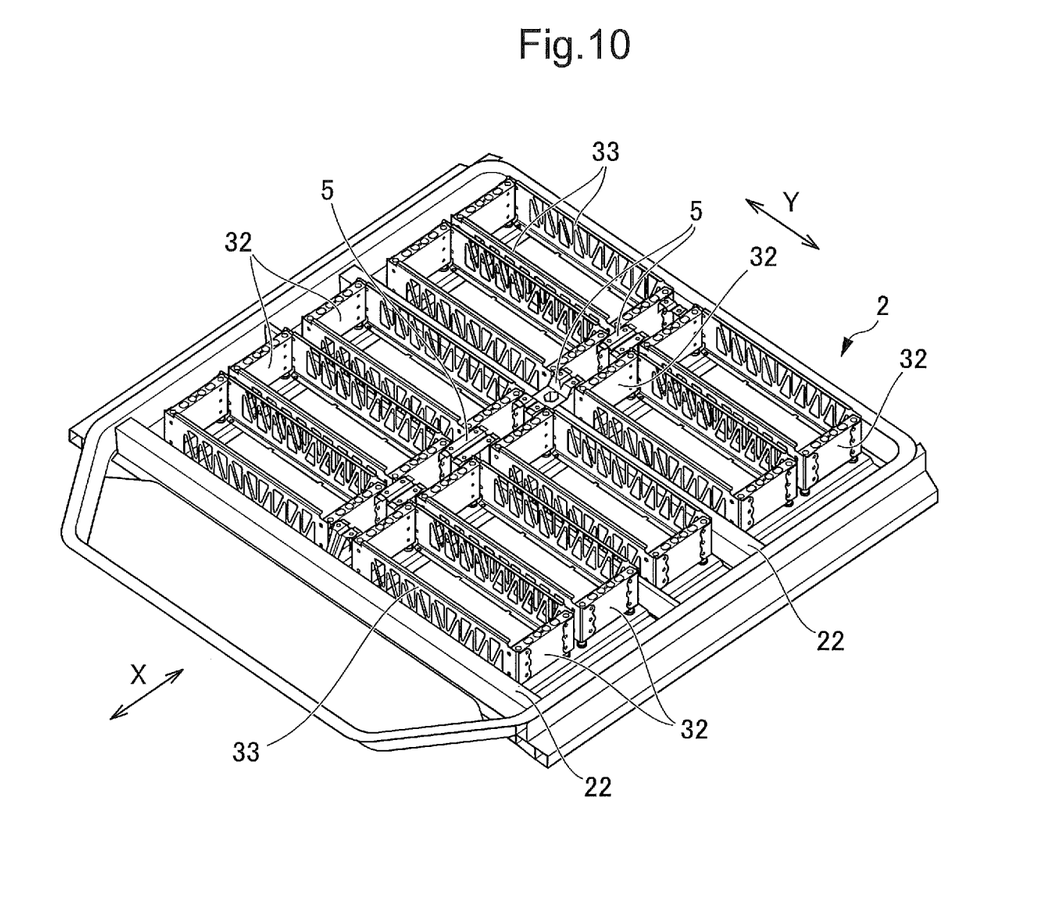
FIG. 10 is a perspective view of a battery pack of another embodiment of the present invention, from which module main bodies of battery modules are removed.
Figure 11:
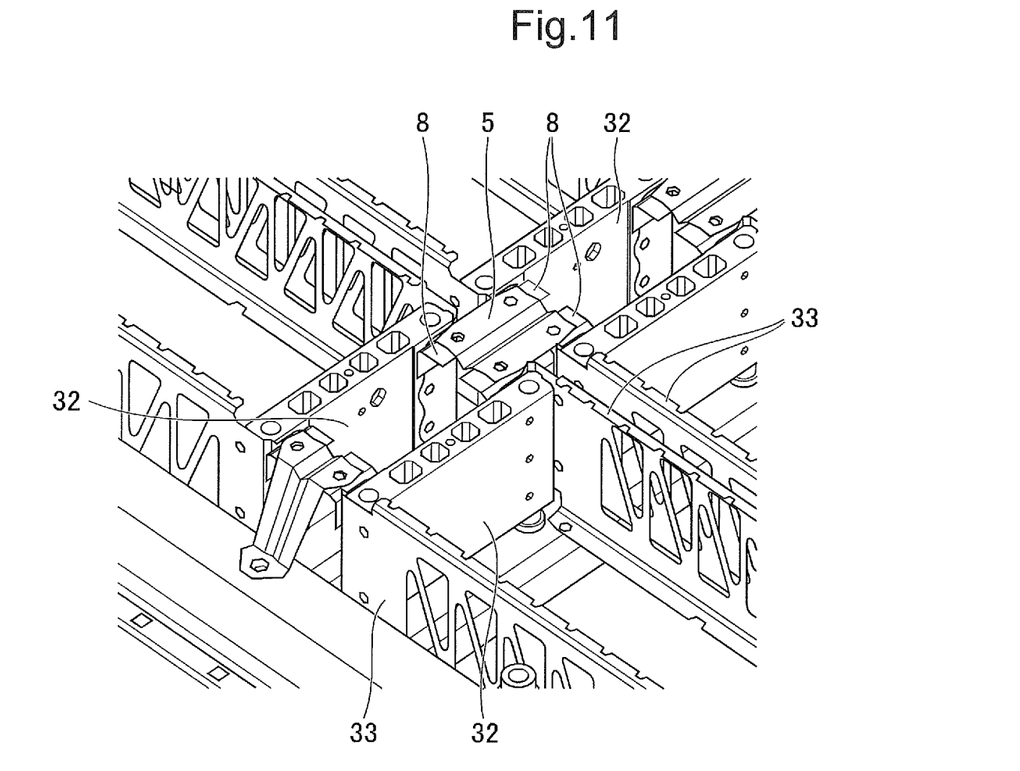
FIG. 11 is an enlarged perspective view of a main part of the battery pack illustrated in FIG. 10.
Figure 12:
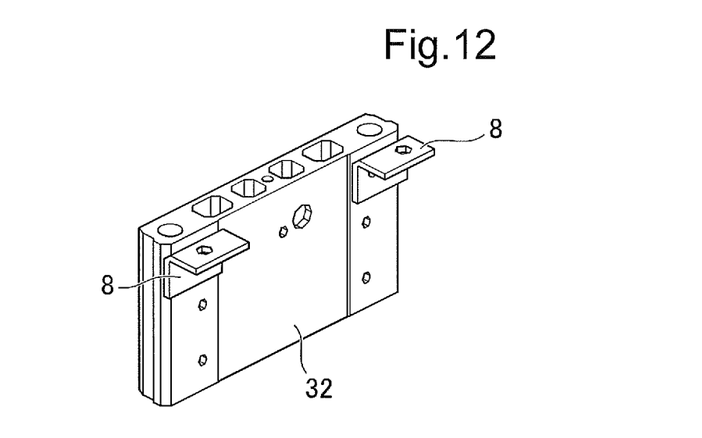
FIG. 12 is a perspective view of how a bracket of the battery pack illustrated in FIG. 10 is being used.

The aforementioned first embodiment and its Modifications 1 to 4 describe cases where the connection member 5 is fixed directly to the end plates 32. However, as illustrated in FIGS. 10 to 12, the connection member 5 may be fixed indirectly to the end plates 32 of battery modules 3 adjacent in the module arrangement direction, by attaching a bracket 8 to the endplate 32 of each battery module 3 and connecting the brackets 8 by the connection member 5. That is, the connection member 5 can be fixed indirectly to the endplates 32, by attaching two L-shaped brackets 8 with bolts fastened to upper parts of each end plate 32 as in FIG. 12, and as is shown in FIG. 10 and FIG. 11, attaching the connection member 5 such that it straddles the end plates 32 adjacent in the module arrangement direction (arrow X direction in FIG. 10), with bolts fastened to the brackets 8 of the end plates 32. In this case, the second insertion holes 35 for the connection member 5 need not be formed in the end plate 32, whereby freedom in design of the end plate 32 is increased.

The aforementioned first embodiment and its Modifications 1 to 4 describe cases where the battery module 3 is formed of the module main body 31, the end plates 32, the side plates 33, and the battery cover 34. However, if there are many cells and the module main body 31 is likely to warp, a center plate (not shown) may be attached in the vicinity of the center of the module main body 31, and second insertion holes 35 for fixing the connection member 5 to the end plates 32 may be formed in a top face of the center plate.

The aforementioned Modification 1 of the first embodiment describes a case where the first insertion holes 52 of the connection member are long holes. Similarly, the first insertion holes 52 of the connection member 5 may be formed into long holes in the first embodiment or its Modifications 2 to 4, as a matter of course.

Moreover, while the aforementioned first embodiment and its Modifications 1 to 4 describe cases where bolts 6 are used as bar-like fastening members for connecting the battery modules 3 together, fastening members other than the bolt 6 (e.g., stud and screw) may be used instead or in addition thereto.

A battery pack (e.g., later-mentioned battery pack 1) of an embodiment is a battery pack in which multiple battery modules (e.g., later-mentioned battery module 3) each having multiple cells laminated therein are arranged along a module arrangement direction perpendicular to a laminate direction of the multiple cells, battery modules adjacent in the module arrangement direction, among the multiple battery modules, being connected through a plate-like connection member (e.g., later-mentioned connection member 5), in which: the connection member has a plane part (e.g., later-mentioned plane portion 51) parallel to the module arrangement direction; and the plane part engages with each of the battery modules adjacent in the module arrangement direction, among the multiple battery modules, to connect the battery modules together.

The plane part of the connection member may have at least two first insertion holes (e.g., later-mentioned first insertion holes 52); each of the battery modules adjacent in the module arrangement direction, among the multiple battery modules, may have at least one second insertion hole (e.g., later-mentioned second insertion hole 35); and the battery modules may be connected together by inserting a bar-like fastening member (e.g., later-mentioned bolt 6) into each of the first insertion holes and the second insertion hole, and fixing the plane part of the connection member to the battery modules.

At least one of the two first insertion holes may be a long hole extending in the module arrangement direction.

Each of the battery modules may have a module main body (e.g., later-mentioned module main body 31), and a pair of endplates (e.g., later-mentioned end plates 32) attached to both end faces of the module main body; and the second insertion hole may be formed in the end plate.

The multiple battery modules may be stored and fixed in a battery case (e.g., later-mentioned battery case 2); and the second insertion hole may be a hole (e.g., later-mentioned hole 32b) for fixing the end plate to the battery case.

The connection member may be fixed to the battery case.

The battery case may have a reinforcement member (e.g., later-mentioned cross members 21, 22); and the connection member may be fixed to the reinforcement member.

Each of the battery modules may have a pair of side plates (e.g., later-mentioned side plate 33) that extend to surround the endplate of the battery module and is fixed while sandwiching the module main body of the battery module from both side faces; and the second insertion hole may be a hole (e.g., later-mentioned hole 32*a*) for fixing the side plate to the end plate.

A bracket (e.g., later-mentioned bracket 8) may be attached to the end plate; and the battery modules adjacent in the module arrangement direction, among the multiple battery modules, may be connected together by connecting the brackets of the battery modules by the connection member.

Each of the battery modules may have a center plate in the vicinity of the center of a module main body of the battery module; and the second insertion hole may be formed in the center plate.

The connection member may have a flange (e.g., later-mentioned flange portion 53) that intersects with the plane part.

The flange may extend along an outer shape of the battery module.

The embodiment can provide a battery pack that can suppress warpage of a battery case caused by the weight of a battery module, avoid degradation in comfort of riding due to vibration of the vehicle, and also prevent separate battery modules from falling off when the battery case burns.

Obviously, numerous modifications and variations of the present invention are possible in light of the above teachings. It is therefore to be understood that within the scope of the appended claims, the invention may be practiced otherwise than as specifically described herein.

What is claimed is:

1. A battery pack in which a plurality of battery modules each having a plurality of cells laminated therein are arranged along a module arrangement direction perpendicular to a laminate direction of said plurality of cells, battery modules adjacent in said module arrangement direction, among the plurality of battery modules, being connected through a plate-like connection member, wherein:
   said connection member has a plane part parallel to said module arrangement direction;
   the plane part engages with each of said battery modules adjacent in said module arrangement direction, among the plurality of battery modules, to connect the battery modules together;
   the plane part of said connection member has at least two first insertion holes;
   each of said battery modules adjacent in said module arrangement direction, among the plurality of battery modules, has at least one second insertion hole;
   the battery modules are connected together by inserting a bar-like fastening member into each of said first insertion holes and said second insertion hole, and fixing the plane part of said connection member to the battery modules;
   each of said battery modules has a module main body, and a pair of end plates attached to both end faces of the module main body;
   said second insertion hole is formed in said end plate;
   said plurality of battery modules are stored and fixed in a battery case; and
   said second insertion hole is a hole for fixing said end plate to said battery case.

2. The battery pack according to claim 1, wherein at least one of said two first insertion holes is a long hole extending in said module arrangement direction.

3. The battery pack according to claim 1, wherein said connection member is fixed to said battery case.

4. The battery pack according to claim 1, wherein:
   each of said battery modules has a pair of side plates that extend to surround the end plate of the battery module and is fixed while sandwiching the module main body of the battery module from both side faces; and
   said second insertion hole is a hole for fixing said side plate to said end plate.

5. The battery pack according to claim 1, wherein:
   a bracket is attached to said end plate; and
   said battery modules adjacent in said module arrangement direction, among the plurality of battery modules, are connected together by connecting said brackets of the battery modules by said connection member.

6. The battery pack according to claim 1, wherein:
   each of said battery modules has a center plate in the vicinity of the center of a module main body of the battery module; and
   said second insertion hole is formed in said center plate.

7. The battery pack according to claim 1, wherein said connection member has a flange that intersects with said plane part.

8. The battery pack according to claim 7, wherein said flange extends along an outer shape of said battery module.

9. A battery pack in which a plurality of battery modules each having a plurality of cells laminated therein are arranged along a module arrangement direction perpendicular to a laminate direction of said plurality of cells, battery modules adjacent in said module arrangement direction, among the plurality of battery modules, being connected through a plate-like connection member, wherein:
   said connection member has a plane part parallel to said module arrangement direction;
   the plane part engages with each of said battery modules adjacent in said module arrangement direction, among the plurality of battery modules, to connect the battery modules together;
   each of said battery modules has a module main body, and a pair of end plates attached to both end faces of the module main body;
   said second insertion hole is formed in said end plate;
   said battery case has a reinforcement member; and
   said connection member is fixed to said reinforcement member.

10. A battery pack comprising:
   a first battery module including laminated cells and having a first outer surface;
   a second battery module including laminated cells and having a second outer surface, the second battery module being provided adjacent to the first battery module;
   a connector having a plane surface and provided on the first battery module and the second battery module such that the plane surface of the connector opposes the first outer surface and the second outer surface to connect the first battery module and the second battery module;
   a first bar fastener inserted into a first insertion hole of the connector and an insertion hole of the first battery module to mount the connector on the first battery module; and a second bar fastener inserted into a second insertion hole of the connector and an insertion hole of the second battery module to mount the connector on the second battery module, wherein each of the first battery module and the second battery module includes a module main body and an end plate attached to an end face of the module main body, the end plate including the insertion hole.

11. The battery pack according to claim 10, wherein at least one of the first insertion hole and the second insertion hole of the connector extends in a module arrangement direction in which the first battery module and the second battery module are arranged.

12. The battery pack according to claim 10, further comprising:

a battery case housing the first battery module, wherein the insertion hole of the end plate of the first battery module is provided to fix the end plate of the first battery module to the battery case.

13. The battery pack according to claim 12, wherein the connector is fixed to the battery case.

14. The battery pack according to claim 10, wherein the first battery module includes a side plate attached to a side face of the module main body, the side plate extending to surround the end plate of the first battery module, and wherein the insertion hole of the end plate of the first battery module is provided to fix the side plate to the end plate of the first battery module.

15. The battery pack according to claim 10, further comprising:

a first bracket attached to the end plate of the first battery module; and a second bracket attached to the end plate of the second battery module and connected to the first bracket to connect the first battery module and second battery module.

16. The battery pack according to claim 10, wherein each of the first battery module and the second battery module includes a center plate in a vicinity of a center of a module main body of the battery module, and wherein the insertion hole is provided in the center plate.

17. The battery pack according to claim 10, wherein the connector includes a flange intersecting with the plane surface.

18. The battery pack according to claim 17, wherein the flange extends along an outer shape of one of the first battery module and the second battery module.

19. The battery pack according to claim 10, wherein the first battery module and the second battery module are adjacent to each other in a module arrangement direction, and wherein the module arrangement direction is perpendicular to a laminate direction in which the laminated cells are laminated.

20. A battery pack comprising:

a first battery module including laminated cells and having a first outer surface;

a second battery module including laminated cells and having a second outer surface, the second battery module being provided adjacent to the first battery module; and a connector having a plane surface and provided on the first battery module and the second battery module such that the plane surface of the connector opposes the first outer surface and the second outer surface to connect the first battery module and the second battery module, wherein each of the first battery module and the second battery module includes a module main body and an end plate attached to an end face of the module main body, the end plate including the insertion hole, wherein the battery case includes a reinforcement member, and wherein the connector is fixed to the reinforcement member.

* * * * *